(12) United States Patent
Durian

(10) Patent No.: US 8,730,038 B2
(45) Date of Patent: May 20, 2014

(54) DEVICE TO REMOTELY CONTROL AN OUTDOOR GRILL OR AN INDOOR OVEN WITH A WEB-ENABLED COMPUTING DEVICE

(75) Inventor: Michael B. Durian, Boulder, CO (US)

(73) Assignee: Michael Durian, Inc., Boulder, CO (US)

(*) Notice: Subject to any disclaimer, the term of this patent is extended or adjusted under 35 U.S.C. 154(b) by 154 days.

(21) Appl. No.: 13/440,059

(22) Filed: Apr. 5, 2012

(65) Prior Publication Data

US 2013/0265159 A1 Oct. 10, 2013

(51) Int. Cl.
| | |
|---|---|
| *G08B 21/00* | (2006.01) |
| *G05B 11/01* | (2006.01) |
| *A47J 27/00* | (2006.01) |
| *A47J 37/10* | (2006.01) |
| *F24B 1/20* | (2006.01) |
| *F24C 15/32* | (2006.01) |
| *A47J 37/00* | (2006.01) |
| *H05B 3/68* | (2006.01) |

(52) U.S. Cl.
USPC .............. 340/540; 340/12.5; 99/330; 99/446; 99/444; 99/422; 126/9 R; 126/21 A; 126/25 B; 219/450.1

(58) Field of Classification Search
USPC ............ 340/540, 541, 636; 99/444, 446, 400, 99/422, 425, 331, 337, 468, 473, 482; 126/274, 271.3, 25, 40, 50; 219/450.1, 219/452.11
See application file for complete search history.

(56) References Cited

U.S. PATENT DOCUMENTS

| | | | | |
|---|---|---|---|---|
| 4,930,488 | A * | 6/1990 | Pearman et al. ............. | 126/39 E |
| 5,310,110 | A * | 5/1994 | Akamatsu et al. .......... | 236/20 A |
| 2004/0226454 | A1 * | 11/2004 | Pirkle et al. ..................... | 99/331 |
| 2006/0144384 | A1 * | 7/2006 | Santagata ................... | 126/25 A |
| 2007/0012307 | A1 * | 1/2007 | Wiker et al. ................ | 126/21 A |
| 2007/0028912 | A1 * | 2/2007 | Gagas et al. .................. | 126/9 R |
| 2008/0165998 | A1 * | 7/2008 | LeClear et al. ............... | 381/345 |
| 2009/0078245 | A1 * | 3/2009 | Chang ......................... | 126/25 B |
| 2009/0104573 | A1 * | 4/2009 | Chen .............................. | 431/72 |
| 2013/0206015 | A1 * | 8/2013 | Jacoby et al. ................. | 99/330 |

* cited by examiner

*Primary Examiner* — Jennifer Mehmood
*Assistant Examiner* — Mirza Alam

(57) ABSTRACT

A grill controller device, which remotely controls any type or grill or oven, comprises a circuit board, a plurality of connector, a power supply system, a control panel, a plurality of temperature control units, a plurality of temperature probes, and a speaker. The grill controller device is wirelessly connected with a graphic user interface so an user can wirelessly operate the grill controller device through the graphic user interface. The grill controller device externally attaches to existing grills and ovens. The plurality of temperature control units adjusts a grill temperature and a plurality of meat temperatures according to the user. A plurality of alerts is controlled by control software and the plurality of alerts comprises different functionality relative to different components. The user is able to control total functionality of the existing grills and ovens through the grill controller device while saving time.

12 Claims, 19 Drawing Sheets

DEVICE TO REMOTELY CONTROL AN OUTDOOR GRILL OR AN INDOOR OVEN WITH A WEB-ENABLED COMPUTING DEVICE

FIELD OF THE INVENTION

The present invention relates generally to grill control device. More specifically, the present invention can be remotely controlled from an electronic device which comprises an intergraded web browser, such as a smart phone or a tablet personal computer.

BACKGROUND OF THE INVENTION

Grilling food on a barbecue grill can be accomplished with two different types of grills. A charcoal grill or a gas grill is used during a grilling process. The grilling process can easily take a long time depending on certain type foods and a user has to be present within the barbecue grill to control the grill temperature and supervise the grilling process. Therefore, the objective of the present invention is to provide a device which remotely operates the barbecue grill from a distance with a web-enabled computing device, which allows more flexibility to the user. The web-enabled computing device connects to the present invention through a remote server. The present invention not only saves time to the user but also provides many improvements over the traditional barbecue grills. The present invention provides real time data to the user during the grilling process and the user can also access prior information regarding the grilling process for so better results can be achieved. The present invention maintains constant or variable cooking temperature profiles so an outdoor grill or an indoor oven can be unattended during a long cooking processes, such as barbecuing and baking. Otherwise, the user has to stay near the grill or oven for many hours until the cooking process is completed. In addition to maintaining a fixed cooking temperature, the user can specify a variable cooking temperature profile that adjusts the grill temperature according to the variable cooking temperature profile. For example, an increased cooking temperature can be used initially for a certain period of time before the temperature is lowered for the remaining of the time. The present invention can be controlled using the connected control panel or using the web-enabled computing device. When used remotely, the present invention connects to the remote server using a local WiFi network as a gateway to the Internet or provides its own integrated web server for local WiFi wireless access. The present invention can also be used with traditional gas or electric stove tops and conventional ovens.

DETAILED DESCRIPTIONS OF THE INVENTION

All illustrations of the drawings are for the purpose of describing selected versions of the present invention and are not intended to limit the scope of the present invention.

Figure 1:
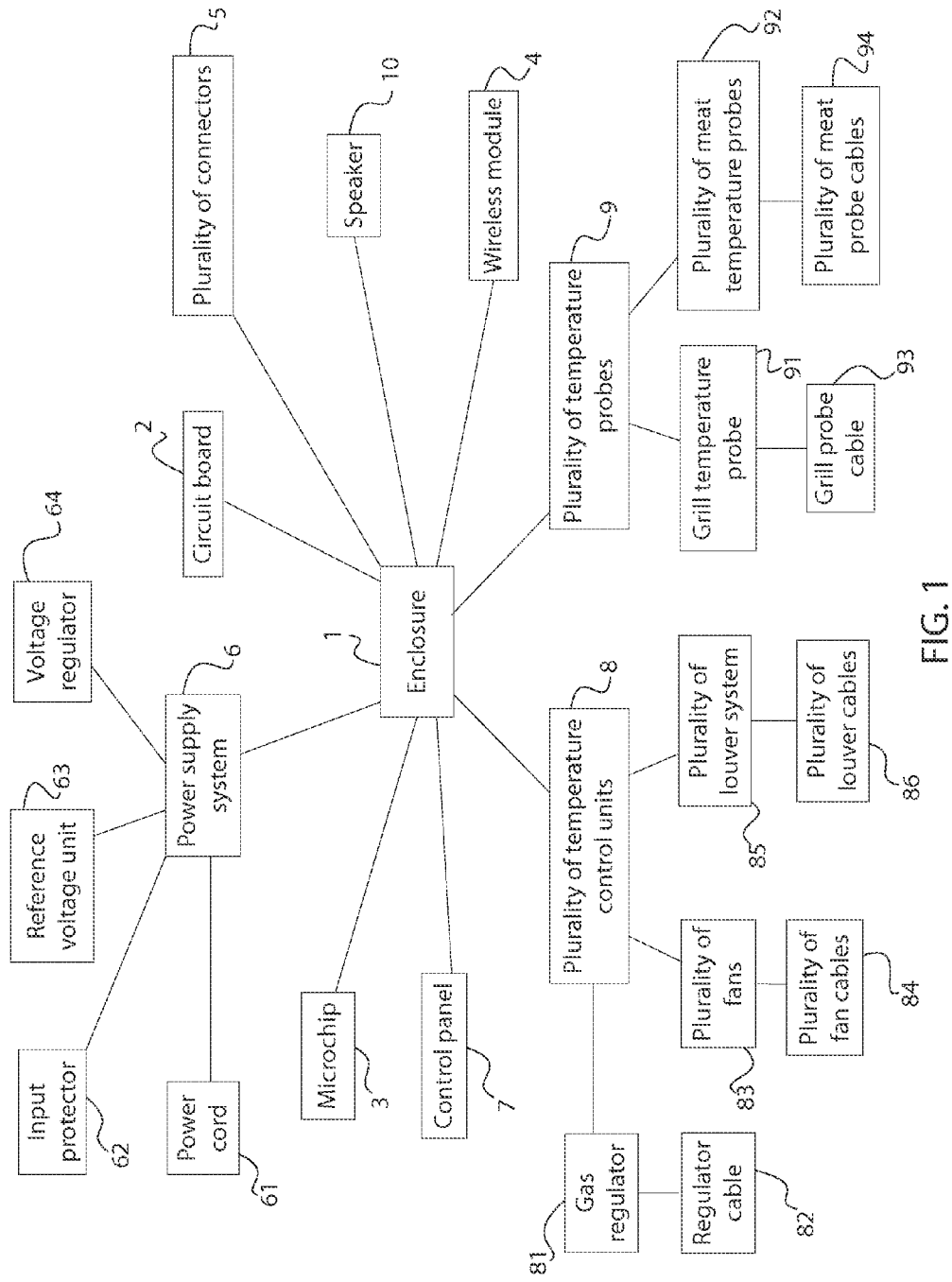
FIG. 1 is view of the system for the present invention.
Figure 2:
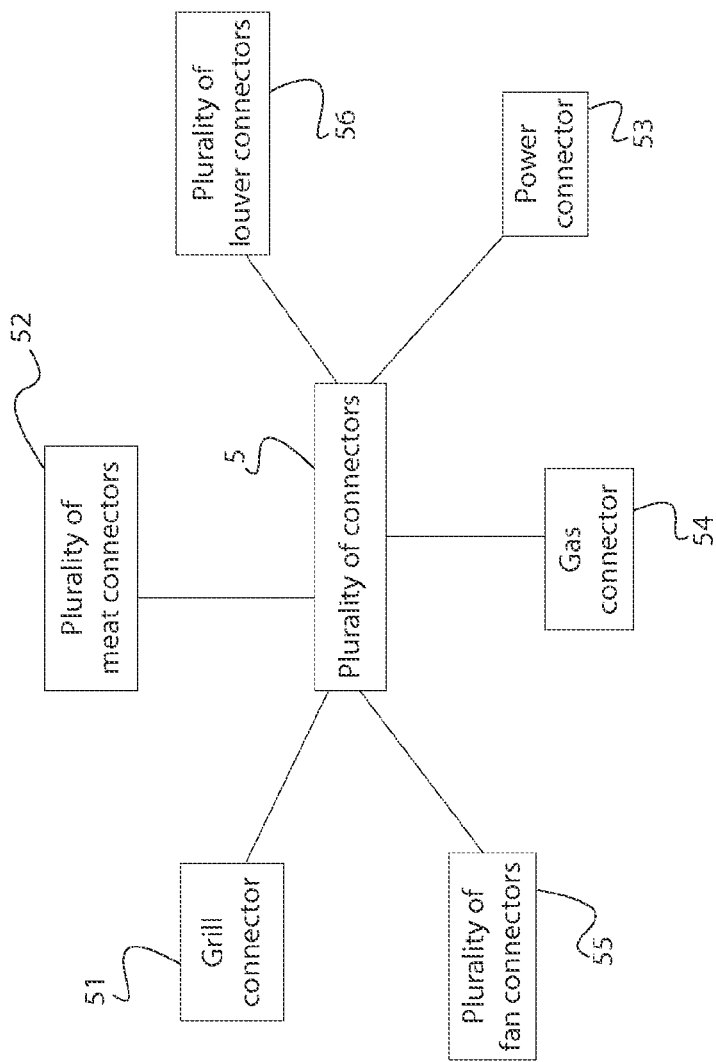
FIG. 2 is view of the system for the plurality of connectors.
Figure 3:
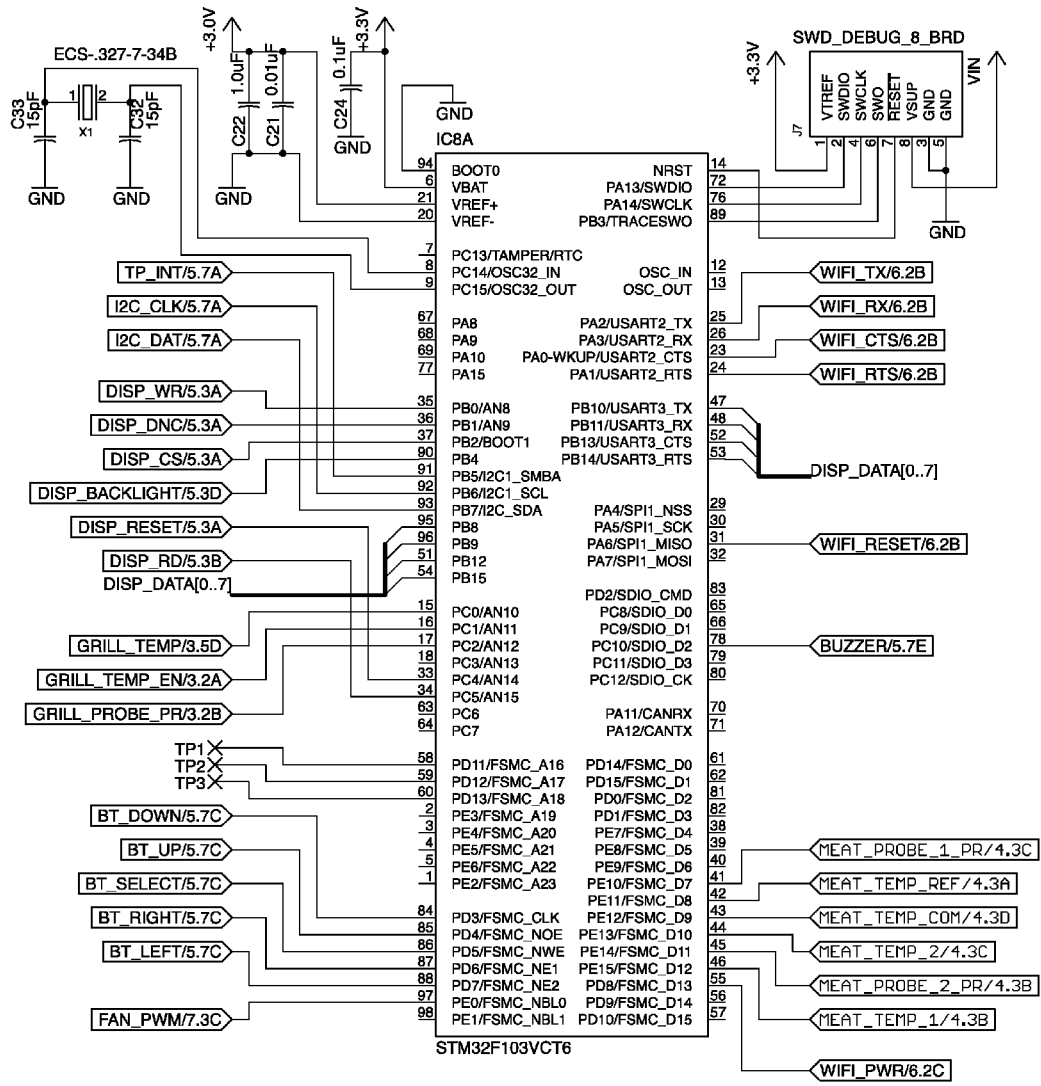
FIG. 3 is a circuit diagram of the present invention's microchip.
Figure 4:
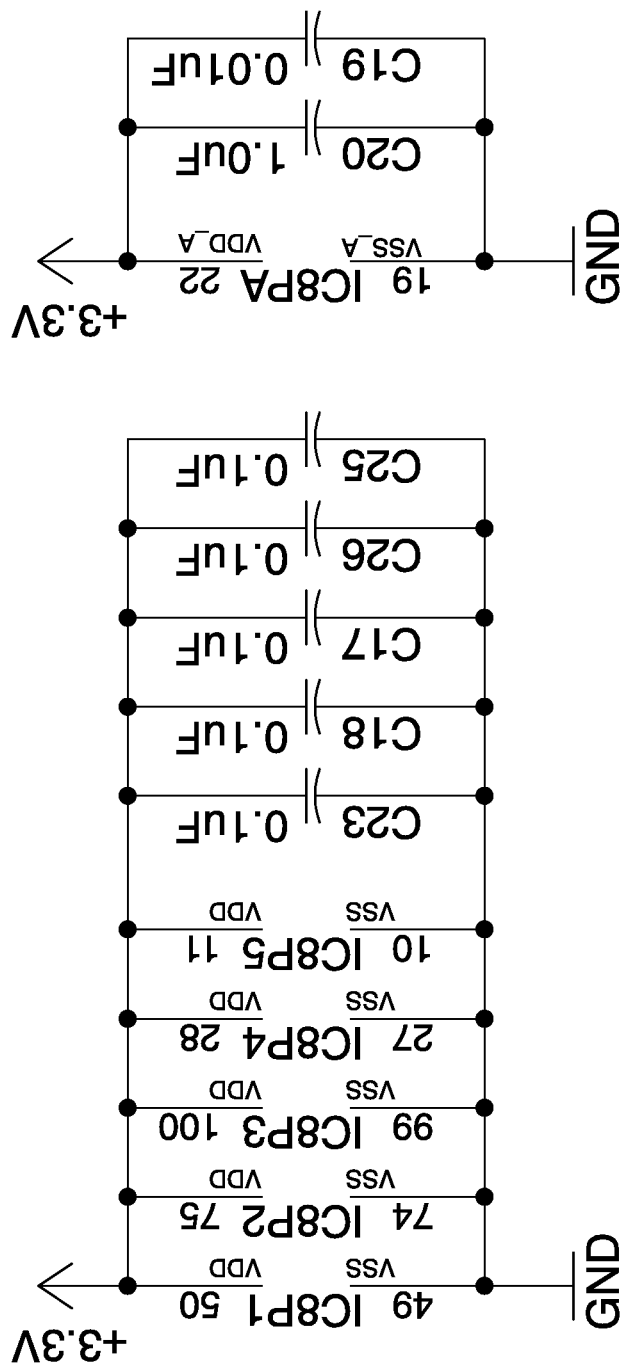
FIG. 4 is a ground circuit diagram of the present invention's microchip.
Figure 8:
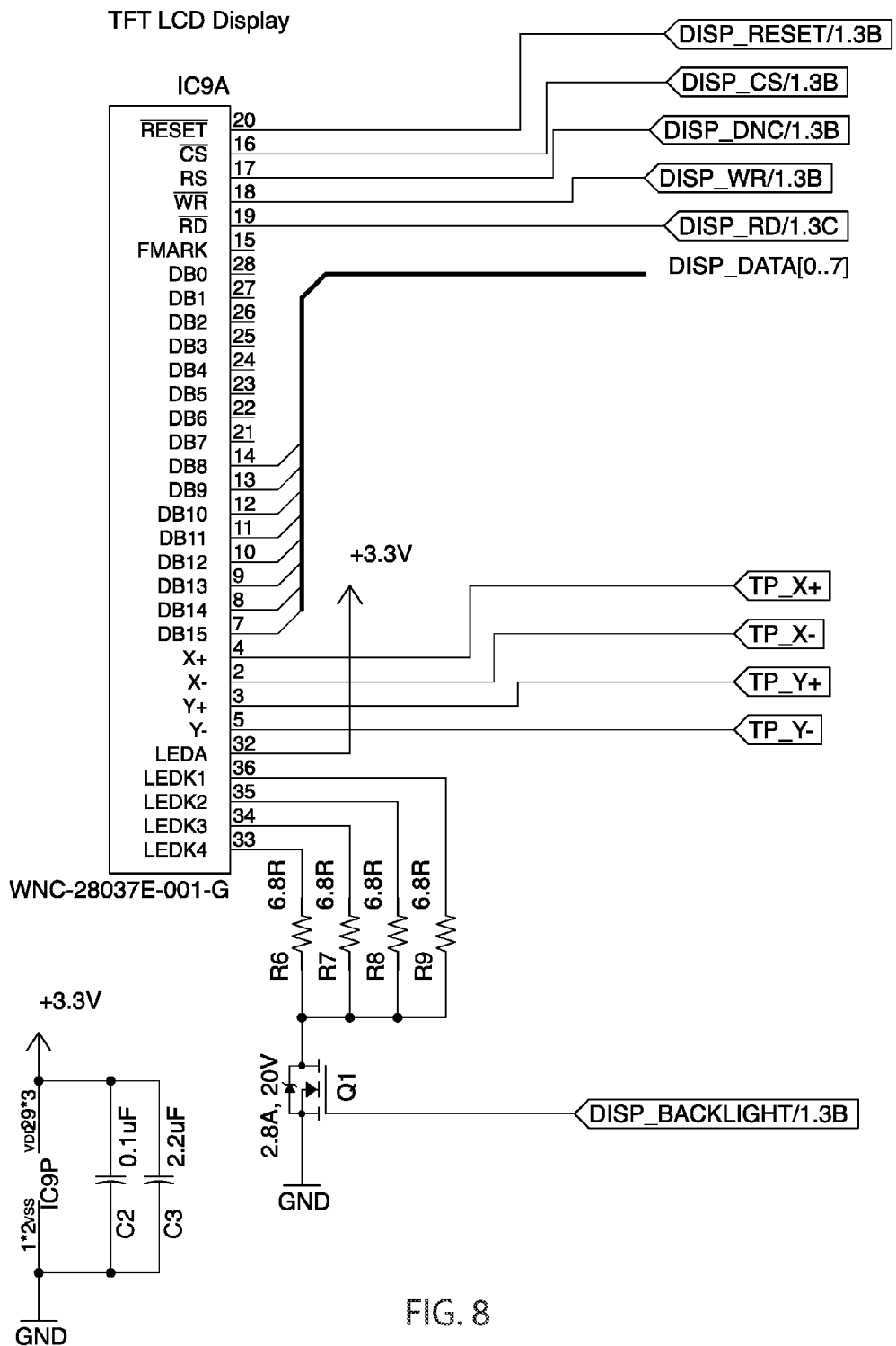
FIG. 8 is a first circuit diagram of the present invention's control panel.
Figure 9:
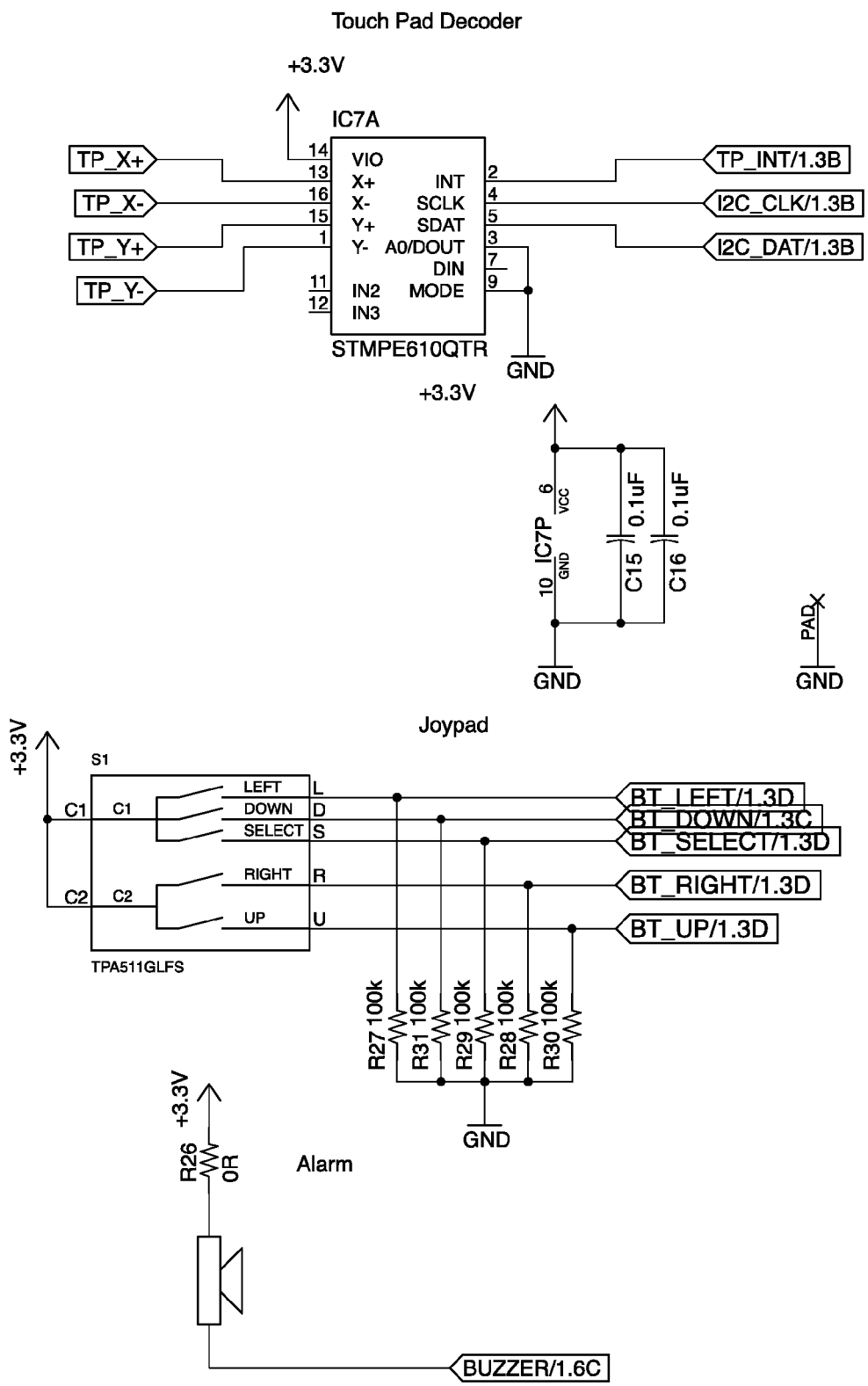
FIG. 9 is a second circuit diagram of the present invention's control panel.
Figure 10:
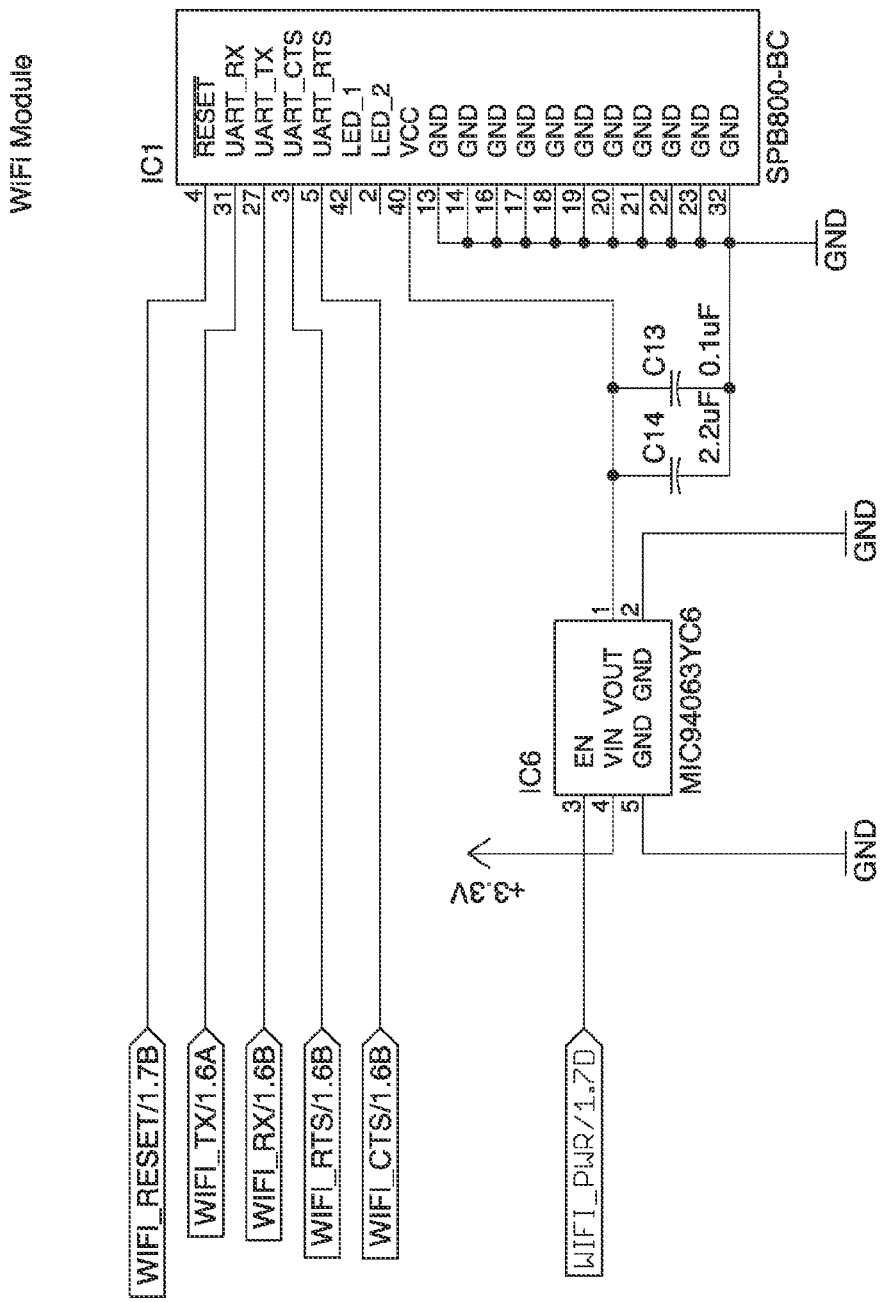
FIG. 10 is a circuit diagram of the present invention's wireless modules.

The present invention is a grill controller device which allows a user to remotely control a cooking process with a web-enabled computing device. In reference to FIG. 1, the grill controller device comprises an enclosure 1, a circuit board 2, a microchip 3, a wireless module 4, a plurality of connectors 5, a control panel 7, and a speaker 10. Electronic devices such as, smart phones, laptops, handheld tablets, or desktop computers can be recognized as the web-enabled computing devices. The enclosure 1 is the casing that houses and protects the electronic components of the grill controller device. The enclosure 1 also provides a base to attach the other components of the grill controller device. The circuit board 2, the microchip 3, and the wireless module 4 are located inside the enclosure 1. In reference to FIG. 3, FIG. 4, and FIG. 10, the microchip 3 and the wireless module 4 are electronically connected to the circuit board 2. The microchip 3 implements the control logic that is used to manage the other electronic components. The wireless module 4 provides Wi-Fi technology to the grill controller device so the grill controller device can be remotely connected. The plurality of connectors 5 is positioned on the enclosure 1 and traversed into the enclosure 1. The plurality of connectors 5 is electronically connected to the circuit board 2. External components of the grill controller device are connected to the enclosure 1 through the plurality of connectors 5. In reference to FIG. 2, the plurality of connectors 5 comprises a grill connector 51, a plurality of meat connectors 52, a power connector 53, a gas connector 54, a plurality of fan connectors 55, and a plurality of louver connectors 56. The control panel 7 which displays all of the operating instruction and other related features of the grill controller device is positioned on the enclosure 1. In reference to FIG. 8 and FIG. 9, the control panel 7 is also electronically connected to the circuit board 2. The control panel 7 can be a touch screen, a plurality of buttons, or a combination of both. Since the control panel 7 is integrated with a web server, the grill controller device can also be operated from the control panel 7. The speaker 10 is positioned on the enclosure 1 and electronically connected with the circuit board 2. The speaker 10 delivers different type of alerts from the grill controller device which are related upon different functionalities. For example, if one of the assigned temperature changes during the cooking process, an alert may trigger informing the user. The different types of alerts are programmed within the microchip 3.

Figure 5:
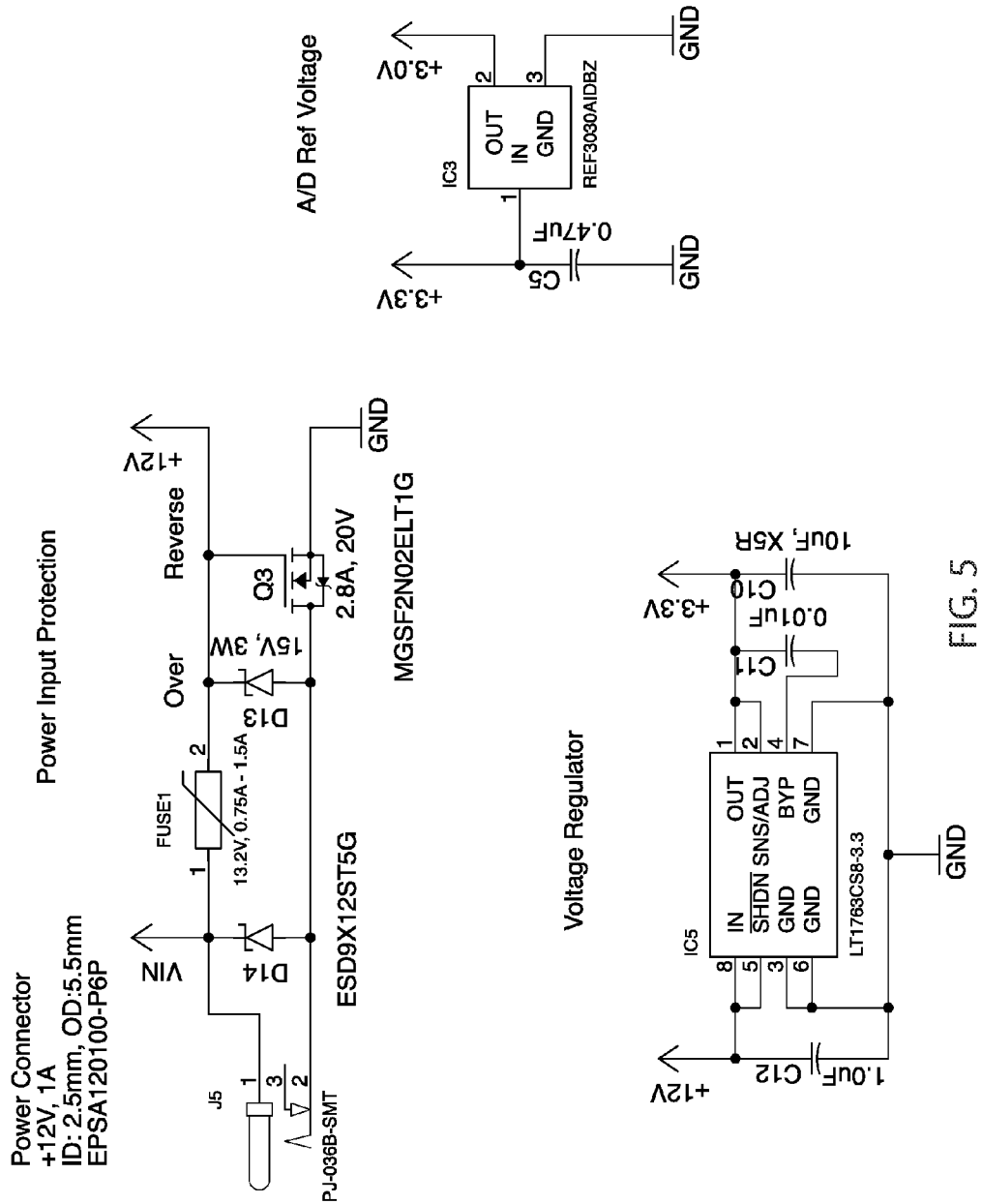
FIG. 5 is a circuit diagram of the present invention's power supply.

The external components that are used in the grill controller device are a power supply system 6, a plurality of temperature control units 8, and a plurality of temperature probes 9. In reference to FIG. 5, the power supply system 6 comprises a power cord 61, an input protector 62, a reference voltage unit 63, and a voltage regulator 64. The power cord 61 is electrically connected with the power connector 53. The power cord 61 with external AC/DC voltage converter supplies the necessary power to the grill controller device when it is mounted with a wall plug. The input protector 62 is electronically connected to the circuit board 2. The input protector 62 protects the circuit board 2 from sudden voltage overloads. The reference voltage unit 63 is electronically connected to the circuit board 2. The reference voltage unit 63 produces a constant voltage irrespective of any power supply variation, temperature changes, and loading on the grill controller device. The voltage regulator 64 is also electronically connected with the circuit board 2. The voltage regulator 64 is an electrical regulator which maintains a constant voltage level.

Figure 11:
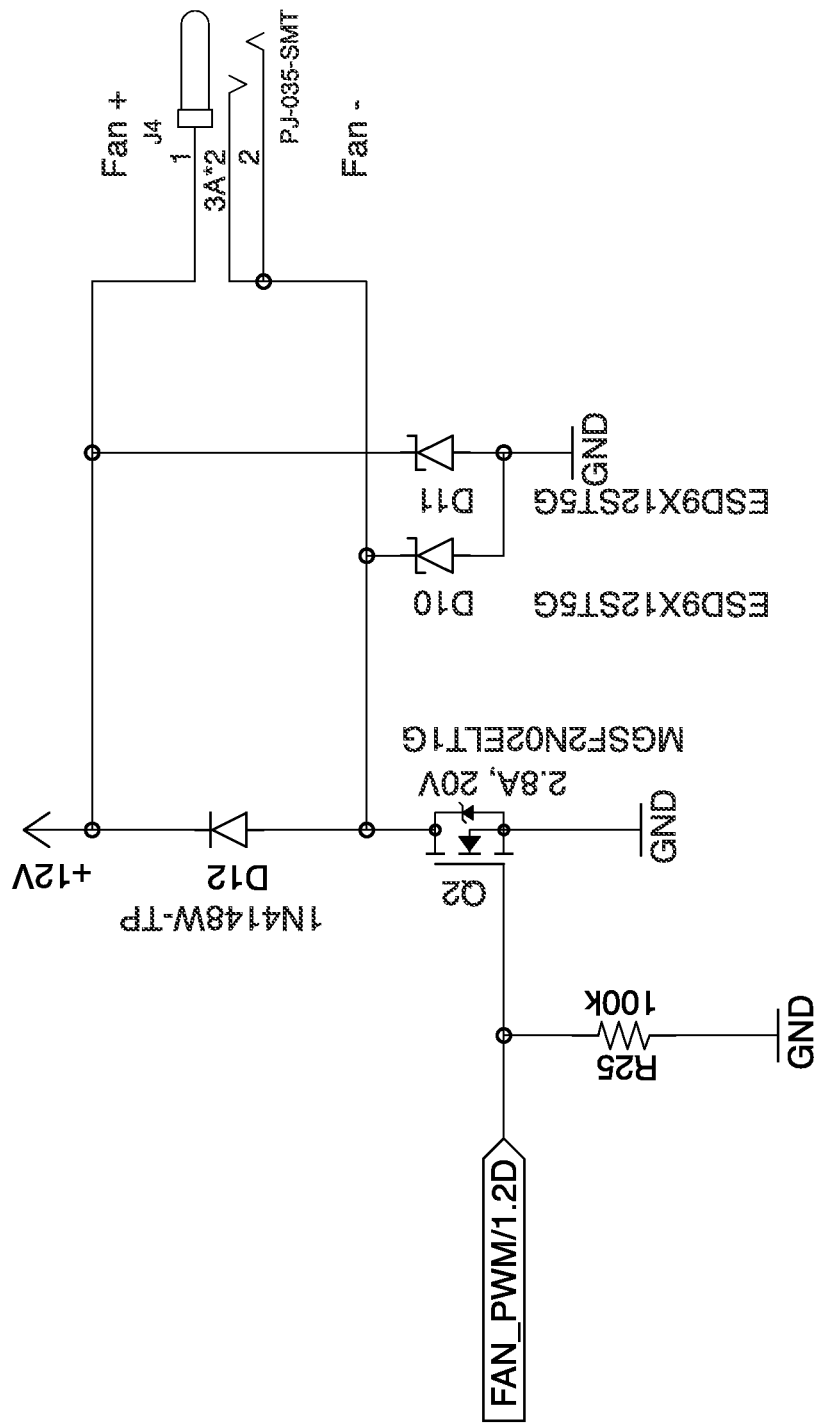
FIG. 11 is a circuit diagram of the present invention's fan controller.

The grill temperature is maintained to the user selectable values using a PID (Proportional Integral Derivative) controller or a similar type of controller which has loop feedback algorithms. The algorithm coefficients are built into the grill controller device or optionally selected through a calibration procedure performed by the user. The plurality of temperature control units 8 is broken down into following three components; a gas regulator 81, a plurality of fans 83, and a plurality of louver systems 85. Even though the functionality of the plurality of temperature control units 8 is the same, the components and their configuration are different related to the gas or charcoal grill and the conventional gas or electric oven. The gas regulator 81 is only coupled with the gas grill and the gas conventional oven. The plurality of fans 83 and the plurality of louver systems 85 are only coupled with the charcoal grill. The gas regulator 81 is electrically connected to the gas connector 54 by a regulator cable 82. The gas regulator 81 controls the amount of gas enters into the gas grill or the conventional gas oven. The gas regulator 81 is designed to be positioned between the gas grill and a gas delivering hose or integrated into the conventional gas oven. For example, the grill controller device might fully open the gas regulator if the user wants to increase the inside temperature in the gas grill or conventional gas oven. The plurality of fans 83 and the plurality of louver systems 85 are aligned together for optimal functionality. In reference to FIG. 11, the plurality of fans 83 is electrically connected to the plurality of fan connectors 55 by a plurality of fan cables 84. The plurality of louver systems 85 is electrically connected to the plurality of louver connectors 56 by the plurality of louver cables 86. The plurality of fans 83 and the plurality of louver systems 85 control the amount of air enter into the charcoal grill. The plurality of fans 83 and the plurality of louver systems 85 are individually customized in order to fit into the existing charcoal grills. The plurality of fans 83 pulls the outside air into the charcoal grill so the inside temperature can be controlled according to the initial settings. When the plurality of fans 83 is operating, the plurality of louver systems 85 stays open. It's possible that the air can enter into the charcoal grill through the nonoperational plurality of fans 83. This can be controlled by the plurality of louver systems 85. For example, if the user wants to eliminate any kind of natural flowing air into the charcoal grill, the user can close the plurality of louver system creating a barrier.

Figure 6:
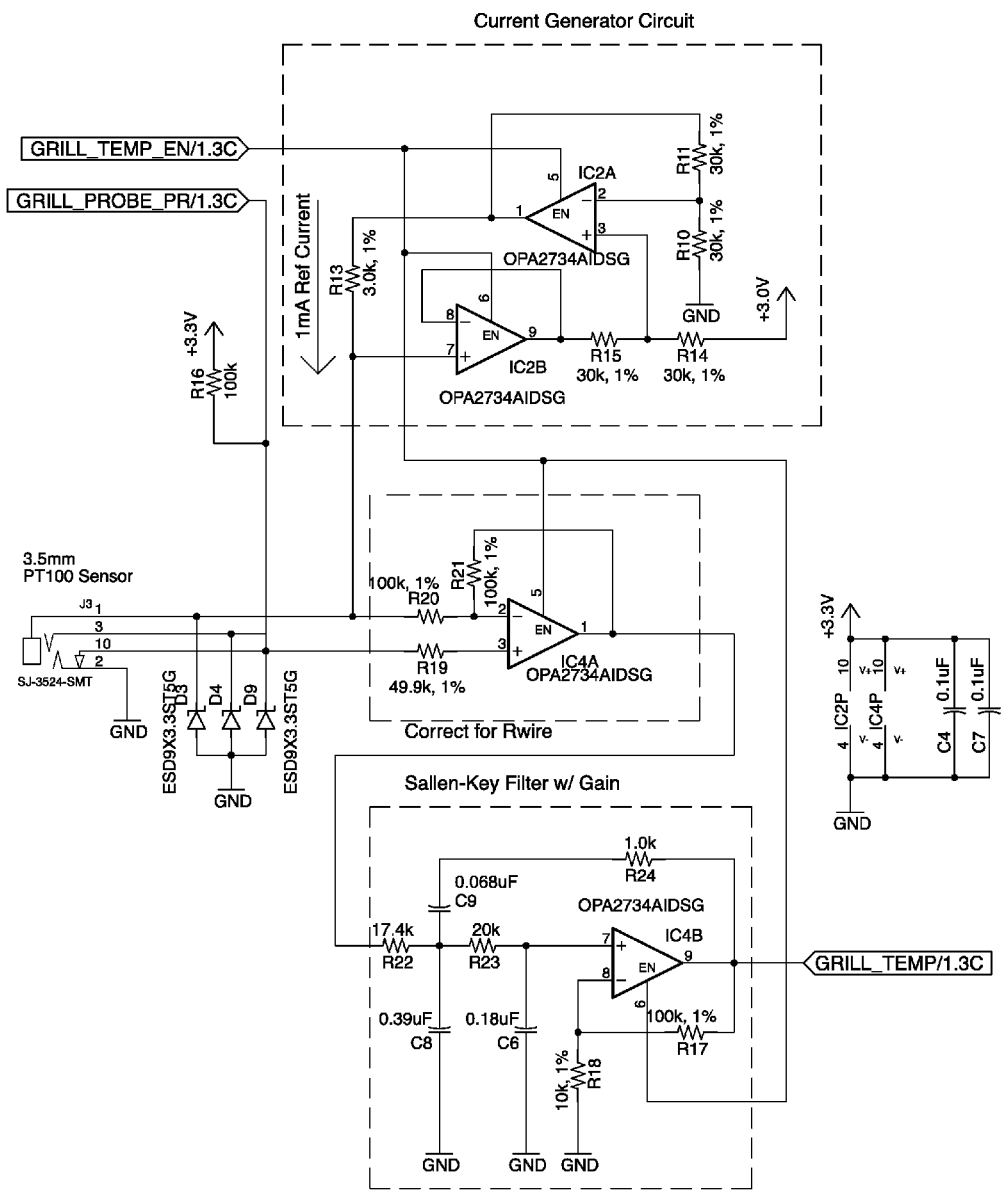
FIG. 6 is a circuit diagram of the present invention's grill temperature probe.
Figure 7:
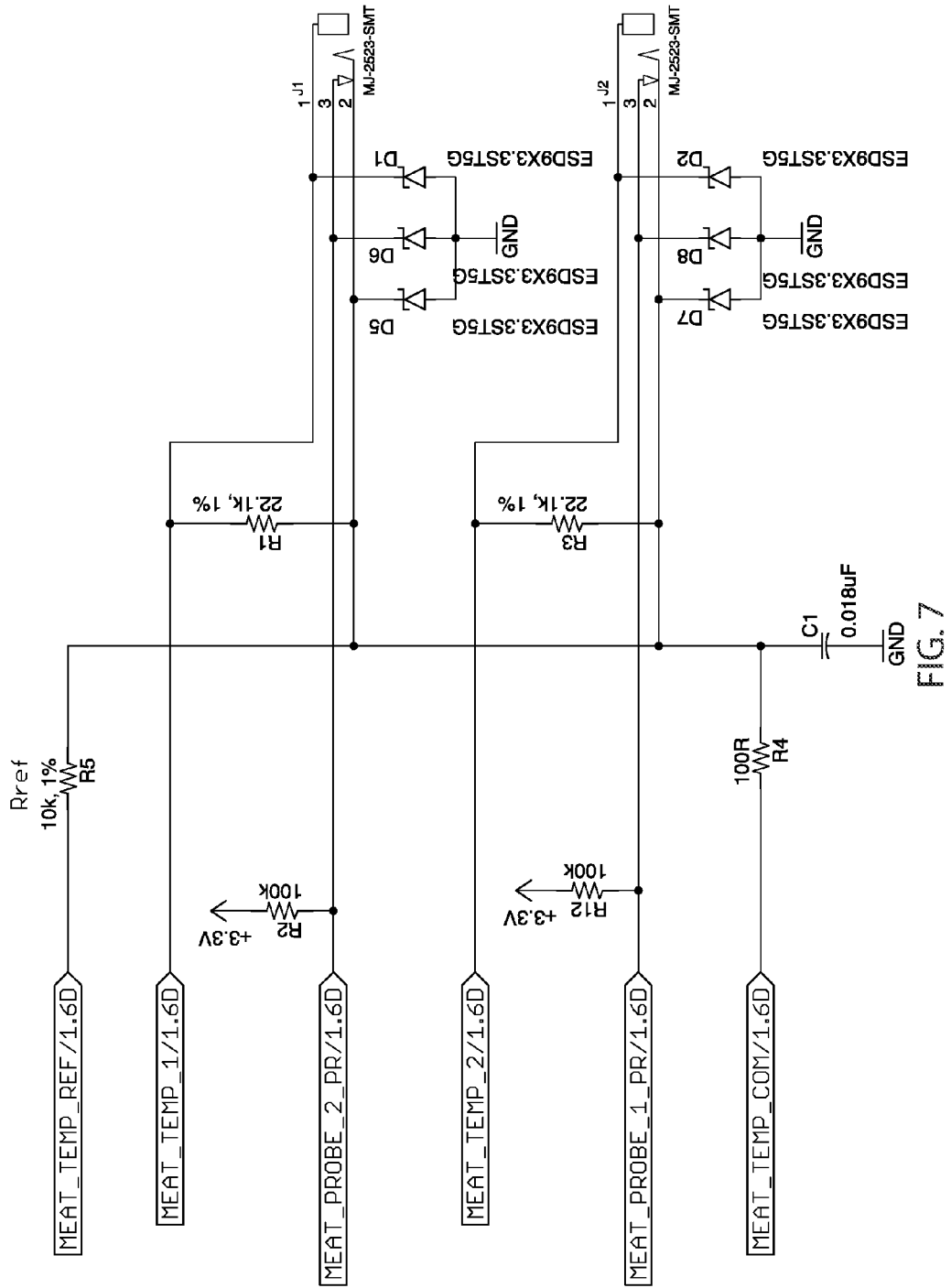
FIG. 7 is a circuit diagram of the present invention's meat temperature probes.

The plurality of temperature probes 9 comprises a grill temperature probe 91 and a plurality of meat temperature probes 93. In reference to FIG. 6, the grill temperature probe 91 is electrically connected to the grill connector 51 by a grill probe cable 92. Since the grill temperature probe 91 measures the grill temperature, the grill temperature probe 91 should be able to withstand increased temperatures. Therefore, Resistive Thermal device (RTD) type probe or thermocouple probe is used as the grill temperature probe 91. In reference to FIG. 7, the plurality of meat temperature probes 93 is connected to the plurality of meat connectors 52 by a plurality of meat probe cables 94. The plurality of meat temperature probes 93 is used to measure the temperature of the foods being cooked. As for the plurality of meat temperature probes 93, Resistive Thermal device (RTD) type probes or thermocouple probes are used. The plurality of meat temperature probes 93 measures different temperatures within a single food item or multiple food items. For example, the plurality of meat temperature probes 93 can measure surface and inside temperature of a single food item or can measure different individual temperatures of different food items.

Figure 12:
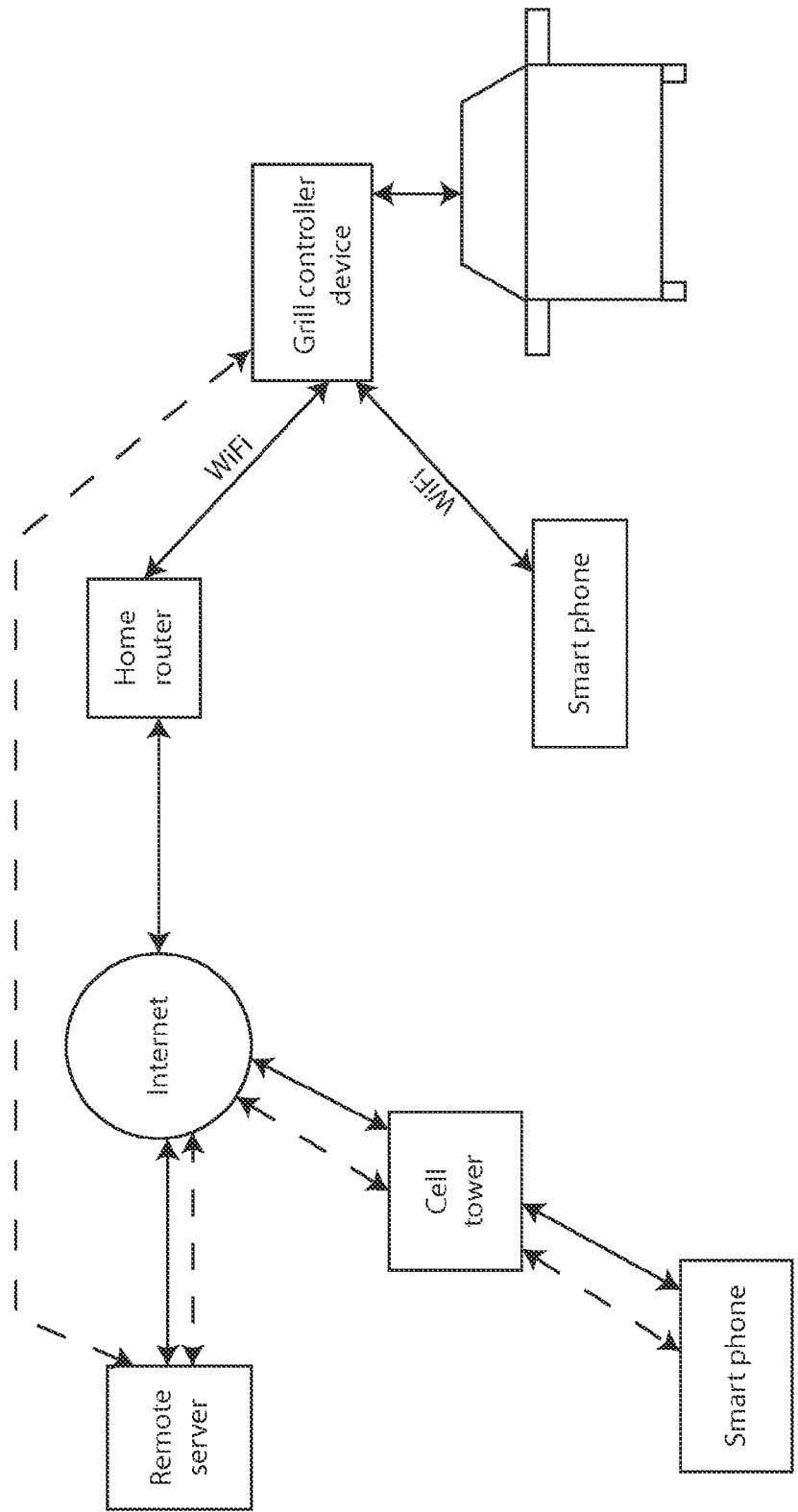
FIG. 12 is a schematic view of the network diagram for the present invention.

In reference to FIG. 12, the grill controller device is able to communicate data along three different communication channels. All three different communication channels connected to the grill controller device are secured data channels. A first channel is provided within the grill controller device's control panel 7. The first channel implements direct control of the grill controller device through the control panel 7 and no internet connection is required. A second channel provides a wireless connection between the grill controller device and the web-enabled computing device through a Wi-Fi network. Since the grill controller device comprises an integrated web server, the grill controller device is able to connect with the web-enabled computing device as long as a Wi-Fi network is present. Then the grill controller device is controlled through the web-enabled computing device. A third channel allows the user to remotely control the grill controller device . While the web-enabled computing device connects with a web server on the remote server, the grill controller device establishes a connection to the remote server. The grill controller device connects with the Wi-Fi network and the Wi-Fi network function as a gateway to the Internet. The remote web server and the grill controller device are connected to each other through the Internet. The web-enabled computing device is connected to the remote web server through the Internet, including any mobile networks. The remote server receives data and sends commands to the grill controller device and functions as the intermediate translator between the grill controller device and the user by means of a web interface.

Figure 13:
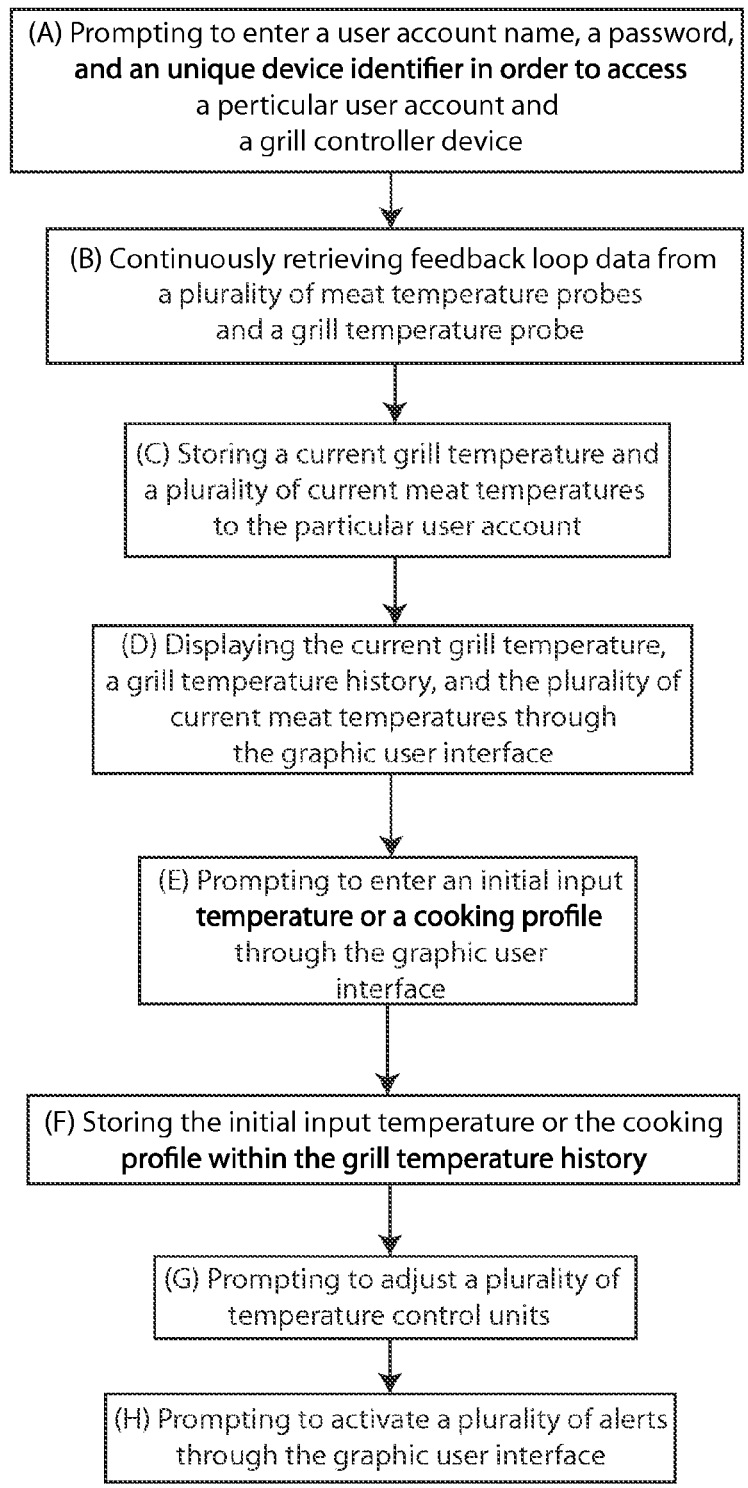
FIG. 13 is a flow chart illustrating the overall process that is followed by the present invention.
Figure 14:
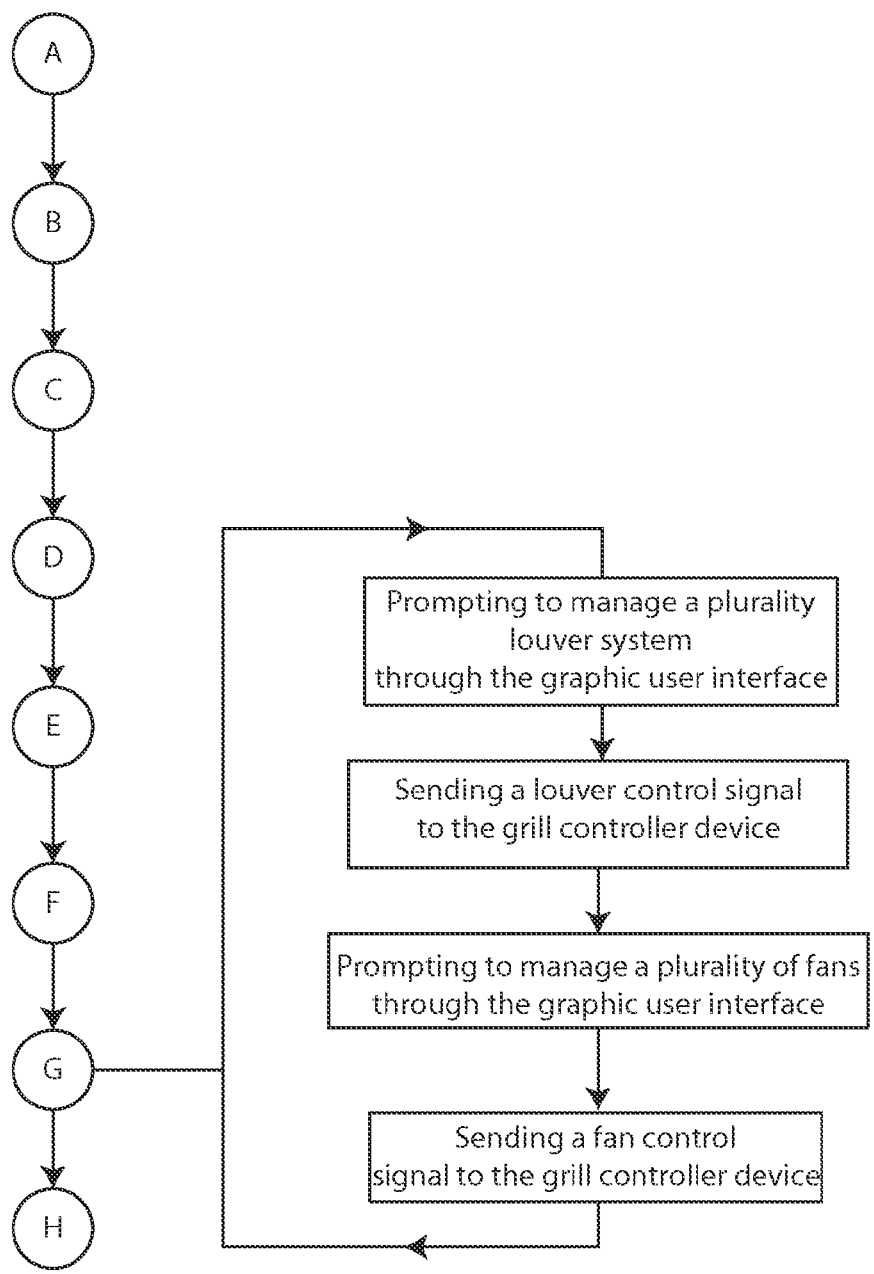
FIG. 14 is a flow chart illustrating the overall process that allows the present invention to adjust the plurality of temperature controls.

After one of the communication channels is utilized between the grill controller device and the web-enabled computing device, Control software allows the user to control and monitor the grill controller device. In reference to FIG. 13, the process begins by the grill controller device connecting to the remote server and authenticating itself by means of a user account name, a password, and a unique device identifier. The unique device identifier distinctly identifies the grill controller device from other grill controller devices associated with the user account. After the grill controller device is authenticated the control software on the remote server establishes a secure link between the remote server and the grill controller device. Then the user connects to the web server on the remote server through the graphic user interface authenticating the same user account name and password. After the user account name and password is authenticated, the control software granted access to a particular user account. The particular user account includes a grill temperature history, a social network profile, and a plurality of recipes and a plurality of grill controller devices associated with that account. Since there are many grill controller devices and a plurality of user accounts are connected to the remote server, the user account name, the password, and the unique device identifier are required to identify the correct user account and the related grill controller device.

Once the user is logged into the remote server, the control software displays a current grill temperature and a plurality of current meat temperatures through the graphic user interface. The current grill temperature and the plurality of current meat temperatures continuously update by a feedback loop data from the grill temperature probe 91 and the plurality of meat temperature probes 93 respectively. Then the current grill temperature and the plurality of meat temperatures are stored into the particular user account. The current grill temperature is also recorded into the grill temperature history where the grill temperature history comprises a plurality of prior grill temperatures. The grill temperature history is also displayed through the graphic user interface along with the social network profile and the plurality of recipes.

Figure 16:
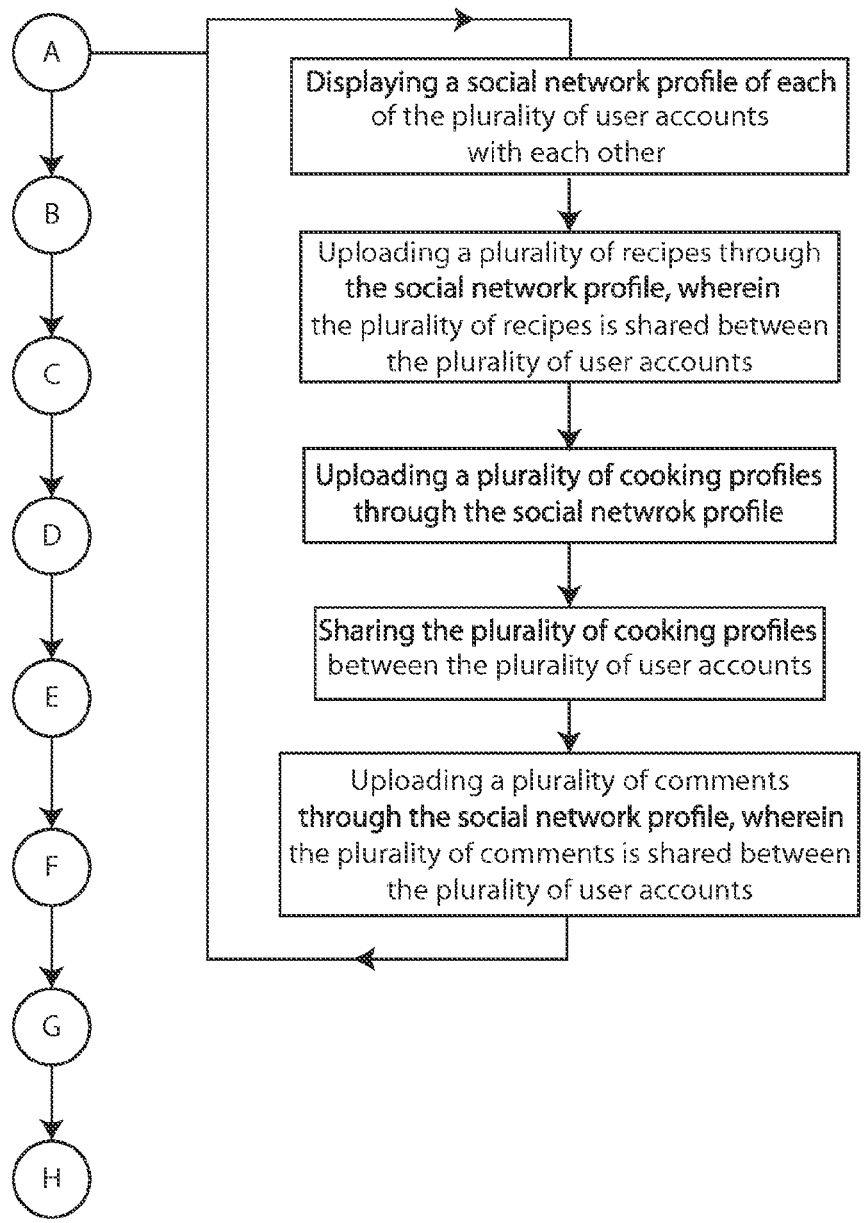
FIG. 16 is a flow chart illustrating the overall process that allows the present invention to access social network and cooking profile.

In reference to FIG. 16, the control software also displays the social network profile of each of the plurality of user accounts to each other creating a social network. Each of the user is able to view and upload the plurality of recipes and upload a plurality of comments through their social network profile. the plurality of comments can be shared comments regarding a specific topic, personal states updates, any relevant new information, or any other related information regarding cooking. All of the uploaded information in the social network is stored under the particular user account. The user of the particular user account can assign his or her privacy levels regarding their information to other users on a per user of global basis. The user can assign multiple access levels such as, no access, view access, or control access. The no access level allows the user to keep all of the uploaded information away from the plurality of user accounts. The view access level allows a specific plurality of user accounts to view the uploaded information. The control access level allows a specific plurality of other user accounts to view and control the grill controller device.

Figure 15:
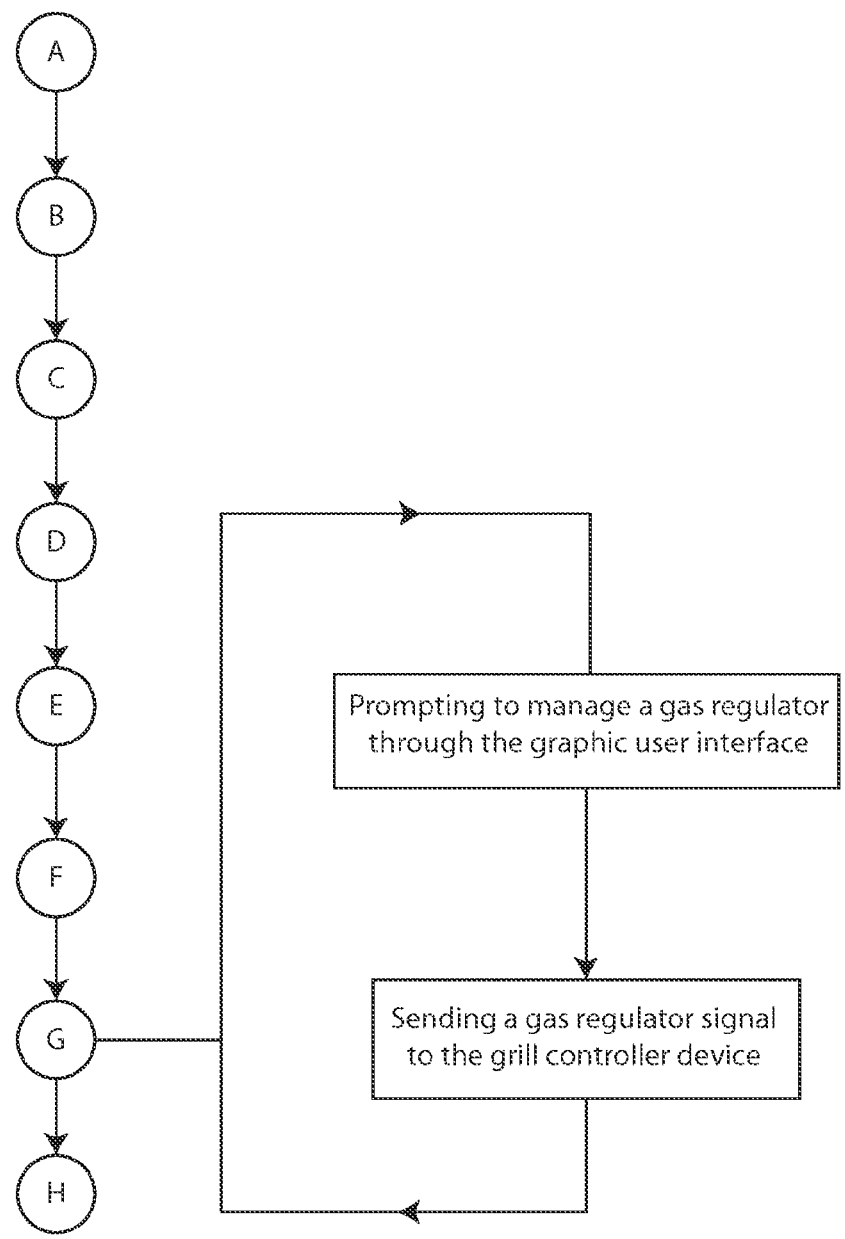
FIG. 15 is a flow chart illustrating the overall process that allows the present invention to adjust the gas regulator.

The control software prompts the user to enter an initial input temperature through the graphic user interface so the cooking process can be started. Then the current grill temperature is automatically adjusted relative to the initial input temperature by the plurality of temperature control units 8. The user may also have the ability to manually override the changes in the grill temperature by controlling the plurality of temperature control units 8. The initial input temperate is also stored into the grill temperature history. In reference to FIG. 15, if the user decides to manage the gas regulator 81 in the gas grill or conventional gas oven through the graphic user interface, the control software sends a regulator control signal to the gas regulator 81. Then the gas regulator 81 allows the user to control overall temperature by controlling the amount of gas enters into the grill or the conventional oven. In reference to FIG. 13, the plurality of louver system 85 and the plurality of fans 83 in the charcoal grill are adjusted through the graphic user interface by a louver control signal and a fan control signal respectively. The plurality of fans 83 and the plurality of louver system 85 allow the user to control overall temperature of the charcoal grill by controlling the amount of air enters into the grill. Then the control software allows the user to activate a plurality of alerts through the graphic user interface. The plurality of alerts comprises a low fuel alert, a plurality of meat temperature alerts, and a plurality of time based alerts.

Figure 18:
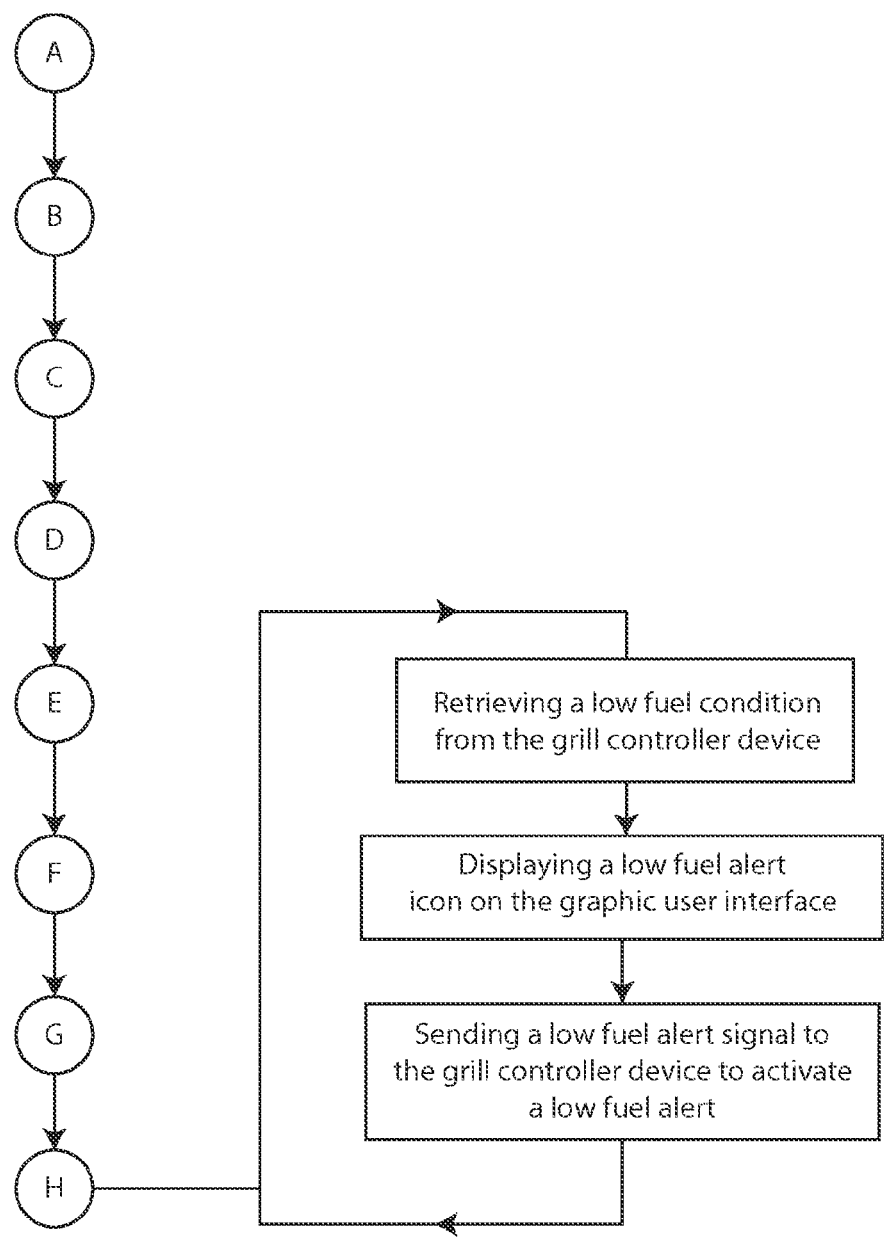
FIG. 18 is a flow chart illustrating the overall process that allows the present invention to activate a low fuel alert.

When the fuel delivery is maximized through the gas regulator 81 or the plurality of louver system 85 and the plurality of fans 83, the inside temperature should increase within a specific time period. In reference to FIG. 18, If the inside temperature does not increase relative to the specific time period, a low fuel condition has occurred within the grill controller device. The low fuel condition is detected by the control software and the low fuel alert triggers, notifying the user though the grill controller device and the graphic user interface. A low fuel alert signal is generated by the grill controller device which translated into the low fuel alert and a low fuel alert icon. The low fuel alert is sounded through the speaker and the low fuel icon is displayed on the graphic user interface.

The control software prompts to enter a grill hold temperature and a plurality of meat temperatures through the graphic user interface. Since the grill hold temperature is define by the user, the user can decide the grill hold temperature according to his or her needs. For example, if the user wants the grill temperature to be 250 degrees Fahrenheit, the grill hold temperature is assigned to 250 degrees Fahrenheit. The grill controller device increases or decreases the current grill temperature according to the grill hold temperature by increasing or decreasing the fuel delivery to the gas grill or air delivery to the charcoal grill according to the PID or other feedback algorithm.

Figure 19:
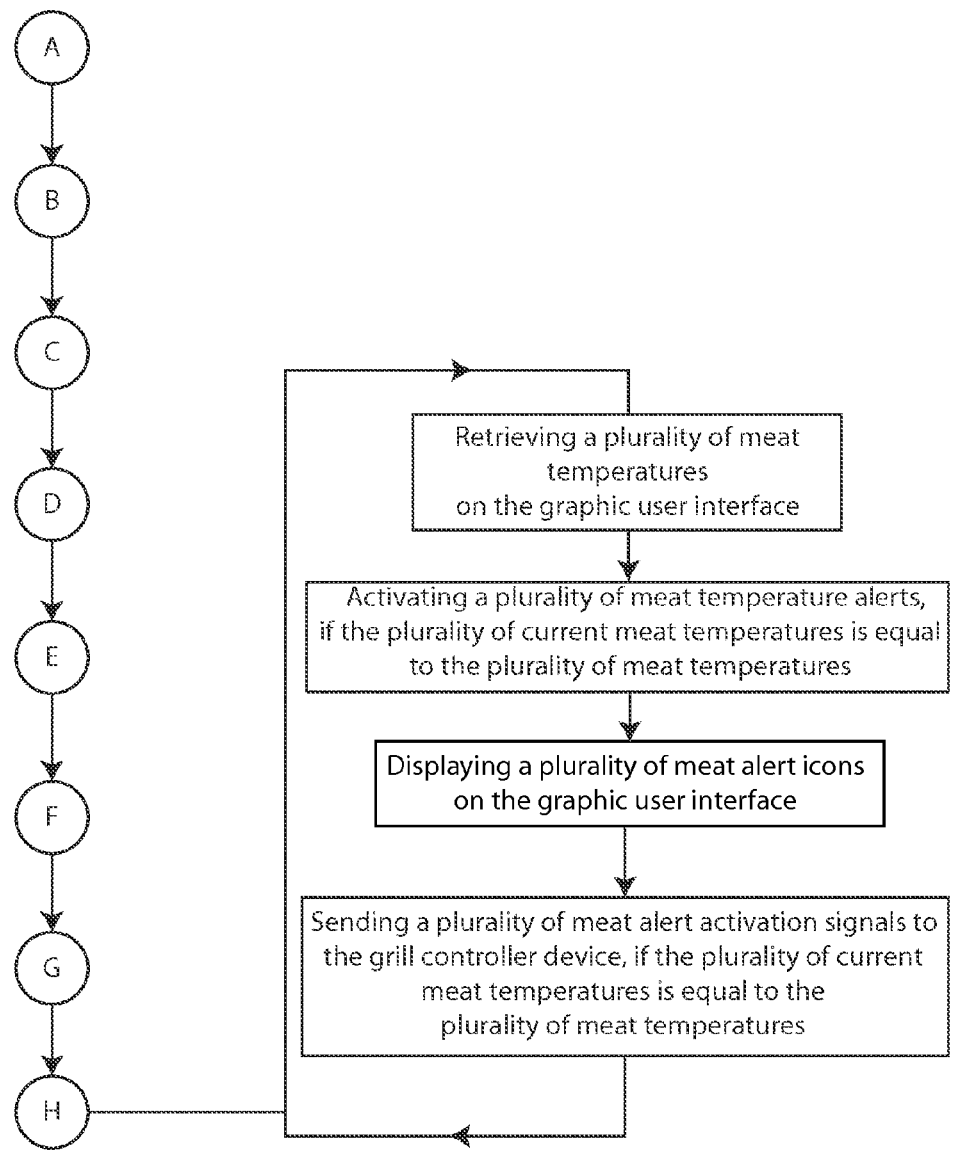
FIG. 19 is a flow chart illustrating the overall process that allows the present invention to activate a plurality of meat temperature alerts.

In reference to FIG. 19, if the plurality of current meat temperatures is equal to a plurality of meat temperatures, the plurality of meat temperature alerts is activated by a plurality of meat alert activation signal and displayed by a plurality of meat alert icons through the graphic user interface. The plurality of meat temperature alerts allows the user to set limitation to the plurality of meat temperature probes 93. For example, if the user wants the plurality of current meat temperatures to be 150 degrees Fahrenheit, the plurality of meat temperatures is assigned to 150 degrees Fahrenheit. At any point, if the plurality of current meat temperatures passes the 150 degrees Fahrenheit, the plurality of meat temperature alerts is triggered. The plurality of meat temperature alerts operates independently from each other allowing the user to set the plurality of alerts within a single food item or multiple food items. The plurality of time based alerts is programmed with the plurality of meat temperature probes 93 or the grill temperature probe 91 so the user can be notified about cooking durations.

Figure 17:
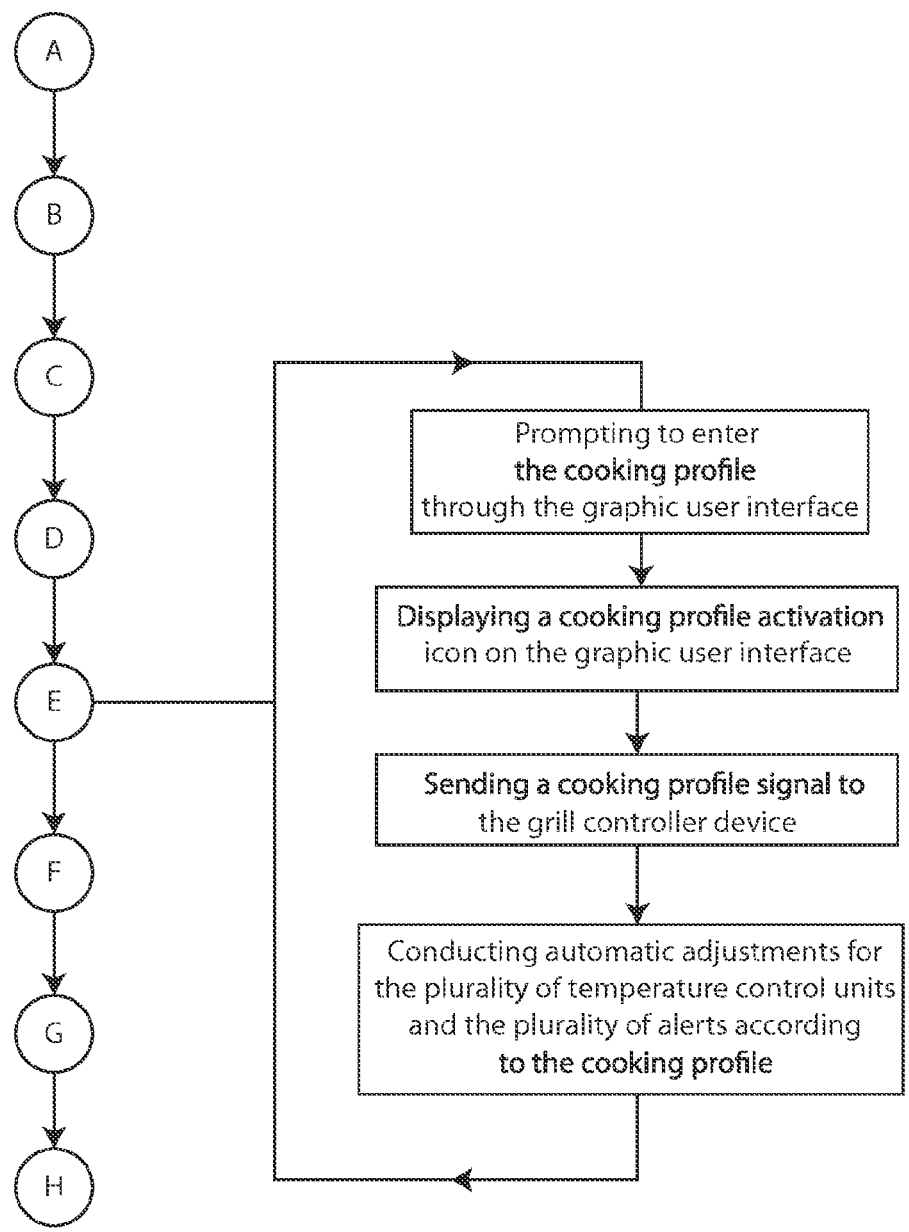
FIG. 17 is a flow chart illustrating the overall process that allows the present invention to upload the cooking profile.

In reference to FIG. 17, when the control software prompts the user to enter an initial input temperature through the graphic user interface, the user can also upload a cooking profile. The cooking profile is programmed by the particular user account and stored to the particular user account. The particular user account can have a plurality of cooking profiles and the plurality of cooking profiles can be uploaded the through the social network profile. Depending on the access levels, each of the plurality of user accounts is able to view the uploaded cooking profiles through the social network and upload the shared cooking profiles to their own grill controller device. A specific plurality of users can also make changes and control the cooking profile, if the specific plurality of users has permission from the user. The cooking profile is programmed with variable temperature changes and the variable temperature changes simultaneously connected with the plurality of temperature control units and the plurality of alerts. The cooking profile can be a simple profile or a complex profile. A possible example for the simple profile is described through the following example; bringing the grill temperature up to 250 degrees Fahrenheit and holding the increased temperature until manual intervention by the user. Possible example for the complex profile is described through the following example; first the grill temperature is brought up to 350 degrees Fahrenheit and the temperature is held for one hour. Secondly the temperature is brought down to 250 degrees Fahrenheit and then the temperature is held until first meat probe reaches 140 degrees Fahrenheit. After the first meat probe reaches 140 degrees Fahrenheit, the user is alerted. Thirdly, the temperature is brought down to 200 degrees Fahrenheit and then the temperature is held until second meat probe reaches 180 degrees Fahrenheit. Finally the fuel delivery is stopped and the user is alerted.

After the cooking profile is prompted, a cooking profile activation icon is displayed on the graphic user interface. Then a cooking profile signal is sent to the grill controller device to activate the cooking process of the prompted cooking profile. The grill controller device then adjusts the grill hold temperature according to the prompted cooking profile. The grill controller device also generates built-in alerts during the cooking process. All of the updated information is displayed through the graphic user interface and uploaded and stored in the remote server. The grill controller device also searches for any kind of uploaded modifications for the prompted cooking profile. Depending on the complexity of the cooking profile, this process can be repeated more than once. Since the cooking profile is fully automated from start to finish, the user is notified through the graphic user interface and a particular time based alert from the plurality of time based alerts, after the cooking process is finished.

Because of the feedback loop data, the user is able to see every temperature changes during the cooking process. If the current grill temperature needs to be changed during the cooking process, the graphic user interface allows the user to adjust temperature through the plurality of temperature control units 8. The feedback loop data also provides updated data to the plurality of alerts so the plurality of alerts is activated with correct precisions.

Although the invention has been explained in relation to its preferred embodiment, it is to be understood that many other possible modifications and variations can be made without departing from the spirit and scope of the invention as hereinafter claimed.

What is claimed is:

1. A grill controller device comprises,
   an enclosure;
   a circuit board;
   a microchip;
   a wireless module;
   a plurality of connectors;
   a power supply system;
   a control panel;
   a plurality of temperature control units;
   a plurality of temperature probes;
   a speaker;
   the circuit board, the microchip and the wireless module being located within the enclosure;
   the plurality of connectors being positioned on the enclosure and traversing into the enclosure;
   the plurality of connectors comprises a grill connector, a plurality of meat connector, a power connector, a gas connector, a plurality of fan connectors, and a plurality of louver connectors;
   the power supply system, the control panel, the plurality of temperature control units, the plurality of temperature probes, and the speaker being positioned around the enclosure;
   the power supply system comprises a power cord, an input protector, a reference voltage unit, and a voltage regulator;
   the power cord being electrically connected to the power connector;
   the input protector being electronically connected to the circuit board;
   the reference voltage unit being electronically connected to the circuit board;
   the voltage regulator being electronically connected to the circuit board;
   the plurality of temperature control units comprises components selected from the group consisting of a gas regulator, a plurality of fans, a plurality of louver systems, a regulator cable, a plurality of fan cables, and a plurality of louver cables;
   the plurality of louver systems being aligned with the plurality of fans;
   the gas regulator being electrically connected to the plurality data ports by the regulator cable;
   the plurality of fans being electrically connected to the plurality of fan connectors by the plurality of fan cables; and
   the plurality of louver systems being electrically connected to the plurality of louver connectors by the plurality of louver cables.

2. The grill controller device as claimed in claim 1 comprises,
   the plurality of connectors being electronically connected to the circuit board;
   the microchip being electronically connected to the circuit board;
   the wireless module being electronically connected to the circuit board;
   the speaker being positioned on the enclosure and electronically connected to the circuit board; and
   the control panel being positioned on the enclosure and electronically connected to the circuit board.

3. The grill controller device as claimed in claim 2 comprises,
   the control panel comprises components selected from the group consisting of a touch screen and a plurality of buttons;
   the touch screen being electronically connected with the circuit board; and
   the plurality of buttons being electronically connected with the circuit board.

4. The grill controller device as claimed in claim 1 comprises,
   the plurality of temperature probes comprises a grill temperature probe, a grill probe cable, a plurality of meat temperature probes, and a plurality of meat probe cables;
   the grill temperature probe being electrically connected to the grill connector by the grill probe cable; and
   the plurality of meat temperature probes being electrically connected to the plurality of meat connectors by the plurality of meat probe cables.

5. A network system for remotely accessing a grill controller device comprises,
   a grill controller device;
   a home router;
   a web-enabled computing device;
   a cell tower;

a remote server;
the grill controller device being communicatively coupled with the remote server through a first secure data channel;
the grill controller device being communicatively coupled with the home router through the Wi-Fi network, wherein the first secure data channel is implemented;
the web-enabled computing device being communicatively coupled with the grill controller device through the Wi-Fi network;
the web-enabled computing device being communicatively coupled with the cell tower through a mobile network, wherein the second secure data channel is implemented;
the cell tower and the second secure data channel being communicatively coupled with the remote server through the worldwide network, wherein the worldwide network is recognized as Internet; and
the web-enabled computing device being communicatively coupled with the remote server through a second secure data channel or through a Wi-Fi network.

6. A method of operating a grill controller device with a computing device by executing computer-executable instructions stored on a non-transitory computer-readable medium, the method comprises the steps of:
providing a plurality of user accounts, wherein each of the plurality of user accounts includes a grill temperature history, a user account name, a password, an unique device identifier, a social network profile, and a plurality of recipes;
providing a grill controller device, wherein the grill controller device comprises a grill temperature probe, a plurality of meat temperature probes, and a plurality of temperature control units;
providing a graphic user interface, wherein a web-enabled computing device or the grill controller device can display the graphic user interface;
prompting to enter the user account name, the password, and the unique device identifier in order to access a particular user account from the plurality of user accounts and the grill controller device;
continuously retrieving feedback loop data for the particular user account from the plurality of meat temperature probes and the grill temperature probe, wherein the feedback loop data includes a current grill temperature and a plurality of current meat temperatures;
storing the current grill temperature and the plurality of current meat temperatures to the particular user account;
displaying the current grill temperature, the grill temperature history, and the plurality of current meat temperatures on the graphic user interface;
prompting to enter an initial input temperature or to create a cooking profile through the graphic user interface;
storing the initial input temperature or the cooking profile within the grill temperature history; wherein the grill temperature history includes a plurality of prior input temperatures and cooking profiles;
prompting to adjust the current grill temperature to the initial input temperature with the plurality of temperature control units, wherein the plurality of temperature control units comprises a plurality of louver systems, a plurality of fans, and a gas regulator; and
prompting to activate a plurality of alerts through the graphic user interface, wherein the plurality of alerts includes a low fuel alert, and a plurality of meat temperature alerts.

7. The method of operating a grill controller device with a computing device by executing computer-executable instructions stored on a non-transitory computer-readable medium, the method as claimed in claim 6 comprises the steps of:
prompting to manage the plurality of louver systems through the graphic user interface;
sending a louver control signal to the grill controller device;
prompting to manage the plurality of fans on the graphic user interface; and
sending a fan control signal to the grill controller device.

8. The method of operating a grill controller device with a computing device by executing computer-executable instructions stored on a non-transitory computer-readable medium, the method as claimed in claim 6 comprises the steps of:
prompting to manage the gas regulator through the graphic user interface; and
sending a regulator signal to the grill controller device.

9. The method of operating a grill controller device with a computing device by executing computer-executable instructions stored on a non-transitory computer-readable medium, the method as claimed in claim 6 comprises the steps of:
displaying the social network profile of each of the plurality of user accounts with each other;
uploading the plurality of recipes through the social network profile, wherein the plurality of recipes is shared between the plurality of user accounts;
uploading a plurality of cooking profiles through the social network profile, wherein the plurality of cooking profiles includes at least one of the cooking profile;
sharing the plurality of cooking profiles between the plurality of user accounts; and
uploading a plurality of comments through the social network profile, wherein the plurality of comments is shared between the plurality of user accounts.

10. The method of operating a grill controller device with a computing device by executing computer-executable instructions stored on a non-transitory computer-readable medium, the method as claimed in claim 6 comprises the steps of:
prompting to enter the cooking profile on the graphic user interface;
displaying a cooking profile activation icon on the graphic user interface;
sending a cooking profile signal to the grill controller device to activate the cooking profile; and
conducting automatic adjustments for the plurality of temperature control units and the plurality of alerts according to the cooking profile.

11. The method of operating a grill controller device with a computing device by executing computer-executable instructions stored on a non-transitory computer-readable medium, the method as claimed in claim 6 comprises the steps of:
retrieving a low fuel condition from the grill controller device, if the current grill temperature does not increase relative to a specified time period;
displaying a low fuel alert icon on the graphic user interface; and
sending a low fuel alert signal to the grill controller device to activate the low fuel alert.

12. The method of operating a grill controller device with a computing device by executing computer-executable instructions stored on a non-transitory computer-readable medium, the method as claimed in claim 6 comprises the steps of:

prompting to enter a plurality of meat temperatures on the graphic user interface;
activating the plurality of meat temperature alerts, if the current grill temperature is equal to the plurality of meat temperatures;
displaying a plurality of meat alert icons on the graphic user interface, if the plurality of meat temperatures is equal to the plurality of meat temperatures; and
sending a plurality of meat alert activation signal to the grill controller device, if the plurality of meat temperatures is equal to the plurality of meat temperatures.

* * * * *